United States Patent
Renaudin et al.

(10) Patent No.: US 10,043,766 B2
(45) Date of Patent: Aug. 7, 2018

(54) PROTECTED INTEGRATED CIRCUIT

(71) Applicant: TIEMPO, Montbonnot St-Martin (FR)

(72) Inventors: Marc Renaudin, Biviers (FR);
Bertrand Folco, Grenoble (FR);
Boubkar Boulahia, Grenoble (FR)

(73) Assignee: TIEMPO, Montbonnot St-Martin (FR)

( * ) Notice: Subject to any disclaimer, the term of this patent is extended or adjusted under 35 U.S.C. 154(b) by 0 days.

(21) Appl. No.: 15/659,218

(22) Filed: Jul. 25, 2017

(65) Prior Publication Data

US 2018/0025996 A1    Jan. 25, 2018

(30) Foreign Application Priority Data

Jul. 25, 2016   (FR) ...................... 16 57129

(51) Int. Cl.
| | |
|---|---|
| *H01L 23/00* | (2006.01) |
| *H01L 23/552* | (2006.01) |
| *G06F 21/87* | (2013.01) |
| *G06K 19/073* | (2006.01) |

(52) U.S. Cl.
CPC .......... *H01L 23/576* (2013.01); *G06F 21/87* (2013.01); *G06K 19/07372* (2013.01); *G06K 19/07381* (2013.01); *H01L 23/552* (2013.01)

(58) Field of Classification Search
CPC .......... H03K 19/003; H03K 19/17764; H03K 19/0033; H03K 19/00346; H03K 19/17768; G06F 21/60; G06F 21/70; G06F 21/75; H05K 1/0275; H05K 2201/10371; G06K 19/07372; G06K 19/07309; G06K 19/073
See application file for complete search history.

(56) References Cited

U.S. PATENT DOCUMENTS

| | | | | |
|---|---|---|---|---|
| 5,880,523 | A  * | 3/1999 | Candelore ............... | G06F 21/86 257/679 |
| 6,208,493 | B1 * | 3/2001 | Duvvury ................. | H01L 25/18 361/111 |
| 6,496,119 | B1 | 12/2002 | Otterstedt et al. | |
| 8,171,330 | B2 * | 5/2012 | Renaudin ......... | H03K 19/00323 713/401 |
| 8,195,995 | B2 * | 6/2012 | Janke .................... | H01L 23/576 714/728 |

(Continued)

*Primary Examiner* — Vibol Tan
(74) *Attorney, Agent, or Firm* — Oliff PLC

(57) ABSTRACT

The integrated circuit includes a functional block performing a logic and/or analog function. A control circuit is configured to transmit at least a first signal to the receiver and receive a second signal from receiver. The electrically conducting lines' first and second series connect the control circuit and receiver to perform the first and second signals' transit. A plurality of monitoring stations is simultaneously connected to first and second series of electrically conducting lines to define a first elementary electric pattern in the electrically conducting lines' first series and a distinct second elementary electric pattern equivalent to first elementary electric pattern in the electrically conducting lines' second series. A shield at least partially covers the functional block. The control circuit is configured to detect modification of first elementary electric pattern with respect to the second elementary electric pattern by absence of receipt of the second signal after a predefined time-out.

13 Claims, 4 Drawing Sheets

(56) References Cited

U.S. PATENT DOCUMENTS

| | | | | |
|---|---|---|---|---|
| 8,522,051 | B2 * | 8/2013 | Hankhofer | H05K 1/0275 29/846 |
| 8,854,075 | B2 * | 10/2014 | Renaudin | H03K 19/21 326/11 |
| 9,069,938 | B2 * | 6/2015 | Moritz | G06F 9/30003 |
| 9,071,446 | B2 * | 6/2015 | Kreft | G06F 21/71 |
| 9,342,710 | B2 * | 5/2016 | Tiemeijer | G06F 21/70 |
| 9,461,826 | B2 * | 10/2016 | Kreft | G06F 21/71 |
| 9,514,081 | B2 * | 12/2016 | Renaudin | G06F 13/4022 |
| 9,514,308 | B2 * | 12/2016 | Filippi | G06F 21/87 |
| 9,716,502 | B1 * | 7/2017 | Sarafianos | H01L 23/576 |
| 2003/0132777 | A1 | 7/2003 | Laackmann et al. | |
| 2003/0218475 | A1 | 11/2003 | Gammel | |

* cited by examiner

PROTECTED INTEGRATED CIRCUIT

BACKGROUND OF THE INVENTION

The invention relates to an integrated circuit provided with a protection device.

The invention also relates to a protection method of an integrated circuit.

STATE OF THE ART

A user exchanges very large amounts of data in electronic form with third parts every day. In order to ensure that this data remains confidential, it is encrypted by means of different encryption algorithms. Numerous studies are performed on the encryption algorithms to make them more and more powerful. Nevertheless, these algorithms are implemented in electronic devices which may be the target of attacks. It may seem more advantageous to find out how the electronic device operates in order to deduce how the encryption algorithm operates.

Several ways of attacking integrated circuits are reported in the literature to deduce the encryption algorithms implemented in these integrated circuits. It is possible for example to cite analysis of the computing time, analysis of the correlation between the processed data and the electric consumption of the circuit, analysis of the electromagnetic emanations or analysis of the emitted photons.

Invasive attacks also exist with the purpose of partially or totally destroying the initial functionality of the integrated circuit by observing the signals which transit within the integrated circuit. In this way, by transmitting known data and comparing the results before and after modification of the circuit, the attackers can guess certain functionalities of the integrated circuit.

An invasive attack is more often than not performed on a decapsulated component or on a bare-chip component. Modification of the integrated circuit can be performed by means of a focused ion beam (FIB) requiring depassivation and local breaking of metallic tracks.

It is also possible to place microprobes on electric tracks of the integrated circuit in order to observe the different signals which circulate between the functional blocks and to thereby discover the functions performed by each of the functional blocks. The attacker can thus examine the exchanges which take place on the communication bus between the processor and memory or between the processor and an encryption block.

Certain circuits are provided with protections against attacks (such as supply voltage sensors, light sensors, clock frequency sensors, etc.). The attacker may however be led to deactivate them by cutting the metal interconnection wires, for example with a laser scalpel or an FIB.

In order to prevent invasive attacks from being made, electric shields further exist covering one or more functional blocks of the integrated circuit. The electric signals are sent within the electric shield from a transmitter to a receiver. If the electric signals do not reach the receiver, the latter deduces that the shield is subject to an invasive attack and can inform the functional block or another component of the integrated circuit of this.

It is however apparent that this solution is not completely satisfactory as it is extremely power-consuming and/or of limited efficiency.

OBJECT OF THE INVENTION

The object of the invention is to provide an integrated circuit comprising a protective device which is easy to implement and more efficient.

The integrated circuit is remarkable in that it comprises:
  a functional block configured to perform a plurality of logic and/or analog functions,
  a protection device comprising:
    a control circuit configured to transmit at least a first signal and to receive a second signal,
    a receiver configured to receive the first signal and to transmit the second signal on receipt of the first signal,
    a first series of electrically conducting lines connecting the control circuit to the receiver to perform transit of the first signal,
    a second series of electrically conducting lines connecting the receiver to the control circuit to perform transit of the second signal,
    a plurality of monitoring stations simultaneously connected to the first and second series of electrically conducting lines to define a first elementary electric pattern in the first series of electrically conducting lines and a distinct second elementary electric pattern equivalent to the first elementary electric pattern in the second series of electrically conducting lines,
    a shield arranged to at least partially cover the functional block, the shield comprising a part of the assembly formed by the first and second series of electrically conducting lines.

The control circuit is remarkable in that it is configured to detect a modification of the first elementary electric pattern with respect to the second elementary electric pattern in the absence of receipt of the second signal after a predefined time-out.

In one development, each monitoring station is configured to measure the difference of occurrence between the first signal and the second signal and to disable propagation of at least one of the first and second signals according to said measurement.

In advantageous manner, each monitoring station is configured to present a first state enabling passage of the first signal and a second state disabling passage of the first signal, each monitoring station being configured to switch from first state to second state on receipt of the first signal and to switch from second state to first state on receipt of the second signal.

It is also advantageous to provide for each monitoring station to be configured to present a second state enabling passage of the second signal and a first state disabling passage of the second signal.

In a particular embodiment, each monitoring station is formed by a sequencer having a first input and a first output connected to two electrically conducting lines of the first series of electrically conducting lines and a second input connected to two electrically conducting lines of the second series of electrically conducting lines.

In advantageous manner, the sequencer is an asynchronous sequencer.

In a particular embodiment, the first and second series of electrically conducting lines are arranged above the functional block. The second series of electrically conducting lines is located between the first series of electrically conducting lines forming the shield and the functional block.

As an alternative, the first and second series of electrically conducting lines are arranged above the functional block. The first series of electrically conducting lines is located between the second series of electrically conducting lines forming the shield and the functional block.

In another alternative, the first and second series of electrically conducting lines are arranged above the functional block. A first part of the first series and a first part of the second series of electrically conducting lines form the shield. A second part of the first series and a second part of the second series of electrically conducting lines are arranged between the shield and the functional block.

In a particular embodiment, the first series of electrically conducting lines comprises a divergence circuit configured to duplicate the first signal received and to supply at least first and second branch-connected lines, the first and second branch-connected lines respectively comprising a first and second sequencer.

It is also advantageous to provide for the control circuit to be configured to request a change of operation of the functional block in response to detection of modification of the first elementary electric pattern with respect to the second elementary electric pattern.

A further object of the invention is to provide a protection method of an integrated circuit that is easier to implement.

The method is remarkable in that it comprises the following successive steps:
providing an integrated circuit comprising:
a functional block configured to perform a plurality of logic and/or analog functions,
a first elementary electric pattern defined by a first series of electrically conducting lines,
a distinct second elementary electric pattern equivalent to the first elementary electric pattern, the second elementary electric pattern being defined by a second series of electrically conducting lines,
a plurality of monitoring stations simultaneously connected to the first and second series of electrically conducting lines,
a shield arranged to at least partially cover the functional block, the shield comprising a part of the assembly formed by the first and second series of electrically conducting lines,
transmitting a first signal on the first series of electrically conducting lines from the control circuit in the direction of a receiver,
checking whether a second signal is received by the control circuit from the second series of electrically conducting lines after a first predefined time-out.

In one development, the control circuit triggers a response strategy modifying the operation of the functional block if the control circuit has not received the second signal after the first predefined time-out. The control circuit is configured to detect a modification of the first electric pattern.

BRIEF DESCRIPTION OF THE DRAWINGS

Other advantages and features will become more clearly apparent from the following description of particular embodiments of the invention given for non-restrictive example purposes only and represented in the appended drawings, in which.

DETAILED DESCRIPTION

In order to discover the specific operation of an integrated circuit and/or more particularly of a functional block 1, penetrators study the signals which circulate between the different components of the electronic circuit and/or of the functional block 1.

Invasive attacks require physical access to the elements constituting integrated circuits and in particular the electric tracks, input/output connection pads, and interconnection buses. The penetrator bares the integrated circuit so as to access the electric tracks for example.

In order to protect the integrated circuit or a part of the integrated circuit against an invasive attack, the circuit is provided with a protection device 2. The protection device 2 is connected to the functional block 1. The connection between the protection device 2 and the functional block 1 can be direct or indirect.

The protection device 2 is configured to detect an invasive attack and to engage a response strategy when the protection device 2 detects a modification of the first electric pattern.

The response strategy comprises a modification of the operation of the functional block 1 in response to detection of this attack. The modification of the behaviour of the functional block 1 can be stopping of the functional block 1, performing another function than the one initially performed, or introduction of parasite signals distorting the operation of the functional block.

A functional block 1 is configured to perform a plurality of logic and/or analog functions. The functional block comprises a plurality of active and/or passive components such as transistors, resistors, capacitors, and impedances which are connected to one another to perform a precise function.

Figure 1:
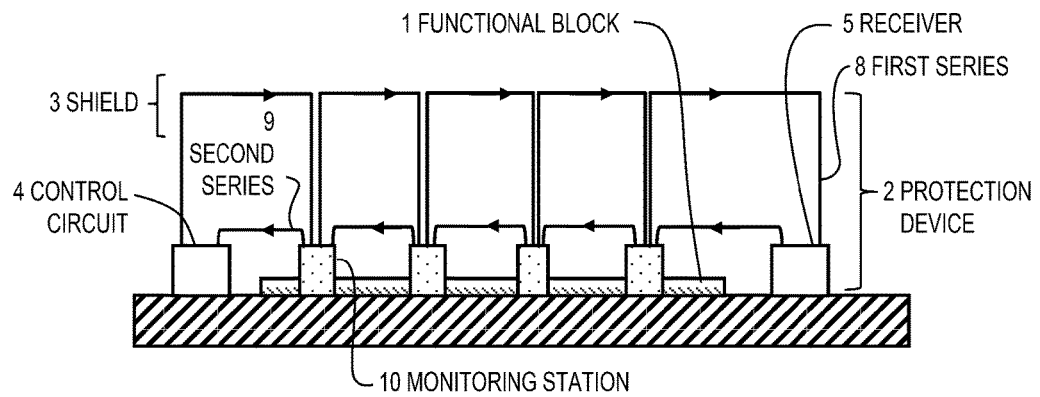
FIGS. 1 and 2 represent an integrated circuit equipped with its protection device, in schematic manner, in cross-section.
Figure 2:
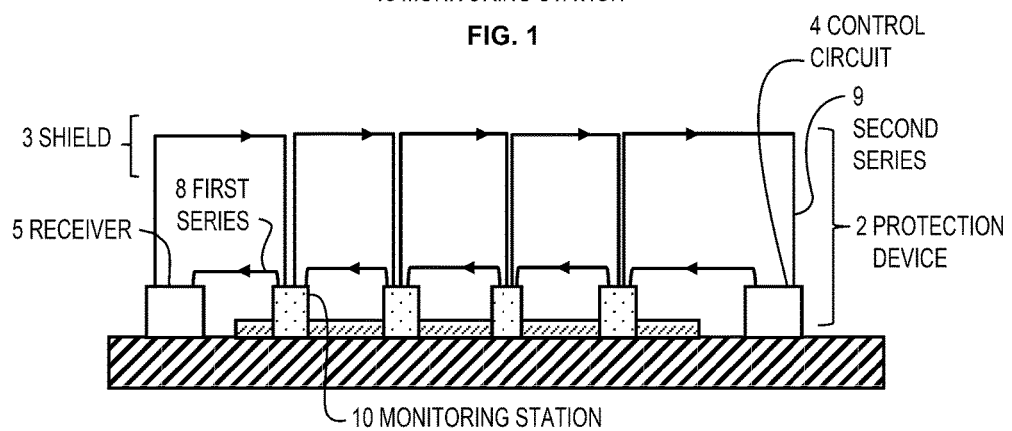

As illustrated in FIGS. 1 and 2, the protection device 2 comprises a shield 3 made from electrically conducting material which is arranged above the components constituting the integrated circuit. The shield 3 can cover the whole of the integrated circuit or only a part of the integrated circuit and in particular the functional block 1.

The protection device 2 comprises at least a plurality of electrically conducting lines. The electrically conducting lines are spaced apart from one another and define a first electric pattern. The protection device 2 will transmit at least one electric monitoring signal which moves along the first electric pattern.

To protect the functional block 1, a part of the electrically conducting lines is used to form a shield 3 which covers the functional block 1. If a penetrator modifies the electric pattern inside the shield 3, the protection device 2 is able to detect this modification and to request a change of operation of the functional block 1 of the integrated circuit. As an alternative, the protection device 2 can comprise several shields 3 configured to protect one or more functional blocks 1 of the integrated circuit.

In one embodiment, the shield 3 can be placed totally above the electric tracks which perform the electric data exchange between the components of the functional block 1 and/or between the different functional blocks 1. In an alternative embodiment, the shield 3 is placed in an electric level which comprises electric tracks forming the shield 3 and electric tracks which participate in electric data exchanges between the components of a functional block 1 and/or between the different functional blocks 1.

The integrated circuit comprises at least one functional block 1 which is advantageously formed by a plurality of transistors. The functional block 1 is configured to perform a plurality of logic and/or analog functions. The transistors are preferably made in a semiconductor substrate. The transistors are connected to one another by electrically conducting lines which are perpendicular to the surface of the substrate and electrically conducting lines which are parallel to the surface of the substrate. The parallel lines define electric levels. The transistors are connected to one another by electric lines according to a specific system which defines one or more precise functions.

It is particularly advantageous to form at least a part of the shield 3 in the last electric level or in the last two electric levels of the integrated circuit, i.e. in the electric level or the two electric levels farthest away from the semiconductor substrate.

If the electric shield 3 covers the whole of the integrated circuit, i.e. all the functional blocks 1, it is more difficult for a penetrator to reach the structure of the components constituting the circuit to observe signals and/or to deduce the function of each of these blocks therefrom.

As an alternative, if the electric shield 3 is formed in the same electric level as the electric tracks involved in transfer of the signals between the different functional blocks 1, it is possible to complicate observation and/or recognition of the different functional blocks 1.

The protection device 2 comprises a control circuit 4 and a receiver 5 configured to exchange first and second signals 6 and 7 through the first electric pattern. The control circuit 4 is distinct from the receiver 5.

Figure 3:
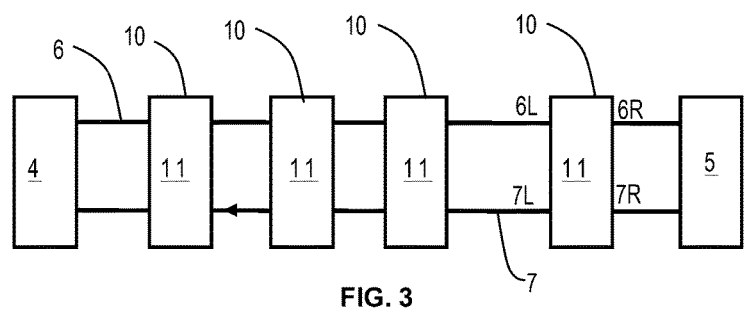
FIG. 3 illustrates a schematic functional representation of a protection device.

As illustrated in FIG. 3, the control circuit 4 is configured to transmit at least a first signal 6 in the direction of the receiver 5 and to receive a second signal 7 from the receiver 5. The first signal 6 is conveyed from the control circuit 4 to the receiver 5. On receipt of the first signal 6, the receiver 5 transmits a second signal 7. The second signal 7 is conveyed from the receiver 5 to the control circuit 4. In advantageous manner, the first signal 6 has a different form from the second signal 7.

In this way, if the first electric pattern is modified and introduces a break or a short-circuit in the first electric pattern, the first signal 6 and/or the second signal 7 can no longer transit. The protection device 2 detects the invasive attack and advantageously informs the functional block 1. In advantageous manner, the control circuit 4 is configured to check whether the second signal has been received before a predefined time-out which starts when the first signal is transmitted. In this way, if no second signal is received after the time-out has expired, the control circuit 4 can consider that an attack is being performed with modification of the first elementary electric pattern with respect to the second elementary electric pattern.

To reinforce security and reduce the risks of by-passing by short-circuiting, the first electric pattern is broken down into at least a first series 8 of electrically conducting lines and a second series 9 of electrically conducting lines distinct from the first series 8.

Monitoring stations 10 are placed along the first series 8 and the second series 9 in order to follow the routing of the signals and to ensure that the first electric pattern has not been modified. The monitoring stations 10 are connected simultaneously to the first series 8 and to the second series 9.

The plurality of monitoring stations 10 defines a first elementary electric pattern in the first series 8 of electrically conducting lines and a second elementary electric pattern in the second series 9 of electrically conducting lines. The second elementary electric pattern is equivalent to the first elementary electric pattern.

In particularly advantageous manner, the monitoring stations 10 are connected to the first series 8 and to the second series 9 of electrically conducting lines so as to form equivalent electric patterns and preferably the same electric pattern in the first series 8 and in the second series 9 of electrically conducting lines. Equivalent electric patterns are electric patterns where the monitoring stations 10 are visited in two strictly opposite orders. Thus, the first monitoring station 10 visited by the first signal 6 is the last monitoring station 10 visited by the second signal 7. In the same way, the last monitoring station 10 visited by the first signal 6 is the first monitoring station 10 visited by the second signal 7.

The control circuit 4 is configured to detect a modification of the first elementary electric pattern with respect to the second elementary electric pattern.

The control circuit 4 is connected to the receiver 5 by the first series 8 of electrically conducting lines. The electrically conducting lines are connected in series and/or in parallel between the control circuit 4 and receiver 5. This first series 8 of electrically conducting lines is used for transit of the first signal 6.

The control circuit 4 is also connected to the receiver 5 by a second series 9 of electrically conducting lines connected in series and/or in parallel between the control circuit 4 and receiver 5. This second series 9 of electrically conducting lines is used for transit of the second signal 7.

In an advantageous embodiment, the first and second series of electrically conducting lines are arranged above the functional block 1, in this way, the first and/or second series of electrically conducting lines prevent a penetrator from having access to the flow of electric data in the functional block 1.

In a first embodiment, the shield 3 is formed exclusively by the first series 8 of electrically conducting lines (FIG. 1). In this case, the first signal 6 is conveyed from the control circuit 4 to the receiver 5 through the shield 3. In advantageous manner, the second series 9 of electrically conducting lines is arranged so as to separate the semiconductor substrate and the first series 8 of electrically conducting lines. The functional block 1 and second series 9 are protected by the shield 3 and it is more difficult to short-circuit the second series 9.

In a second embodiment, the shield 3 is formed exclusively by the second series 9 of electrically conducting ones. In this case (FIG. 2), the second signal 7 is conveyed from the receiver 5 to the control circuit 4 through the shield 3. In advantageous manner, the first series 8 of electrically conducting lines is arranged so as to separate the semiconductor substrate and the second series 9 of electrically conducting lines. The functional block 1 and the first series 8 are protected by the shield 3 and it is more difficult to short-circuit the first series 8.

In certain configurations, the embodiment of FIG. 1 is more advantageous than that of FIG. 2 as it is more robust against an attack by a short-circuit.

The two embodiments are particularly advantageous as a single series of electrically conducting lines is used to form the shield 3 and the penetrator does not have access to the other series of electrically conducting lines. It is then much more complicated to understand the operation of the protection device 2.

As an alternative, the shield 3 can comprise only a part of the first series 8 of electrically conducting lines and/or only a part of the second series 9 of electrically conducting lines. A first part of the first series 8 of electrically conducting lines and a first part of the second series 9 of electrically conducting lines form the shield 3. A second part of the first series 8 of electrically conducting lines and a second part of the second series 9 of electrically conducting lines are arranged between the shield 3 and the plurality of transistors of the functional block 1.

The first part of the first series 8 of electrically conducting lines and the second part of the second series 9 of electrically conducting lines are associated by the monitoring stations 10. The second part of the first series 8 of electrically conducting lines and the first part of the second series 9 of electrically conducting lines are associated by the monitoring stations 10.

In order to prevent a penetrator from modifying the form of the shield 3 without modifying the first electric pattern, it is particularly advantageous to place a plurality of monitoring stations 10 along the first electric pattern. In this way, during its transit between the control circuit 4 and receiver 5, the first signal 6 will pass through the plurality of monitoring stations 10. In the same way, the second signal 7 will pass through the plurality of monitoring stations 10 from the receiver 5 to the control circuit 4. In this way, if a short-circuit is performed in the shield 3 and this short-circuit excludes a monitoring station 10 for one of the signals and not for the other, the protection device 2 is able to detect the attack and advantageously inform the functional block 1.

In even more advantageous manner, the monitoring station 10 is formed inside the surface occupied by the functional block 1 and protected by the shield 3 to make it less vulnerable.

However, in order to limit the possibilities of modifications on the electric pattern, it is advantageous to use a large quantity of monitoring stations 10 which may result in a large increase of the electric power consumed by the protection device.

For example, to detect that a monitoring station 10 has been short-circuited, it can compare the frequency of the occurrences of the monitoring signals with respect to a reference frequency. Such an embodiment is complicated to implement and is power-consuming. The same is the case by observing the distortions of the monitoring signal with respect to a reference form. It is advantageous to find another way of proceeding.

In an advantageous embodiment, the monitoring station 10 compares the occurrences of the first signal 6 with the occurrences of the second signal 7 in order to detect a modification of the electric pattern. If the monitoring station 10 detects that the difference between the number of occurrences of the first signal 6 and the number of occurrences of the second signal 7 is strictly greater than 1, it can engage an action which informs the control circuit thereof. This action can be blocking of the signal which arrives on its input.

It is particularly advantageous to provide monitoring stations 10 configured to present at least a first state and a second state different from the first state.

In one embodiment, the first state is an On state for the first signal 6. The first signal 6 can therefore pass through the monitoring station 10 to reach the next monitoring station 10 or the receiver 5. The second state is an Off state which prevents the first signal 6 from passing.

In another embodiment, the second state is an On state for the second signal 7. The second signal 7 can therefore pass through the monitoring station 10 to reach the next monitoring station 10 or the control circuit. The first state is an Off state which prevents the second signal 7 from passing.

These two embodiments can be combined.

In preferential manner, when the first signal 6 reaches a first input of a monitoring station 10, the latter switches from a first state to a second state and allows passage of the first signal 6. If the monitoring station 10 is already in the second state, it remains in the second state and blocks the first signal 6 which does not pass through the monitoring station 10.

When the second signal 7 reaches a second input of a monitoring station 10, the latter switches from the second state to the first state. If the monitoring station 10 is already in the first state, it remains in the first state and disables the second signal 7 which does not pass through the monitoring station 10.

As the first signal 6 progressively passes through the different monitoring stations 10, the latter switch from first state to second state and the first signal 6 can transit from the control circuit 4 to the receiver 5.

If one of the stations is in the second state, the first signal 6 cannot pass through the monitoring station 10 and the first signal 6 cannot reach the receiver 5. For example, if a monitoring station 10 has been short-circuited and the second signal 7 did not reach it, it remains in the second state.

As the second signal 7 progressively passes through the different monitoring stations, the latter change state. The monitoring station 10 switches from a second state to a first state and the signal can transit from the receiver 5 to the control circuit 4. If one of the stations is already in the first state, the second signal 7 cannot pass through the monitoring station 10. For example, if a monitoring station 10 has been short-circuited and the first signal 6 did not reach it, it remains in the first state.

In this way, if one of the monitoring stations 10 is short-circuited, the second signal 7 cannot reach the control circuit 4 and the protection device 2 can inform the functional block 1.

Switching from first state to second state is associated with transmission of a first signal 6 on the first output terminal of the monitoring station. Switching from second state to first state is associated with transmission of a second signal 7 on the second output terminal of the monitoring station.

The plurality of monitoring stations 10 is configured to switch between first state and second state in response to receipt of the first signal 6 or of the second signal 7. In this way, alternation of the first and second signals makes it possible to ensure that the first electric pattern has not been modified.

In this way, if the electric pattern of the shield 3 is modified to short-circuit a monitoring station 10, the latter will disable passage of a first signal 6 or of a second signal 7.

In one embodiment, the monitoring station 10 comprises or is formed by a sequencer. In preferential manner, the sequencer is an asynchronous sequencer.

To perform this functionality, it is particularly advantageous to use monitoring stations 10 which are asynchronous circuits. The use of asynchronous circuits enables both the power consumption and the latency in comparison with a synchronous device to be reduced. The protection device 2 can comprise an asynchronous device containing the control circuit 4, monitoring stations 10 and receiver 5. In preferential manner, it is possible to use exclusively first and second signals for operation of the protection device 2 in the first electric pattern. In an even more particular embodiment, it is possible to use the transitions of the first and second signals. It is also possible to dispense with a clock signal.

In an asynchronous operation, the first signal 6 can be considered as a request signal and the second signal 7 can be considered as an acknowledge signal.

In the following description, request and acknowledge designate local monitoring signals which enable synchronisation between the components of the asynchronous device, here between the monitoring stations 10. Two successive monitoring stations 10 are connected by a communication channel between the two components. The communication channel can be formed by one or more wires conveying the first signal 6 and by one or more wires conveying the second signal 7.

The first and second series of electrically conducting lines form the wires in the communication channel.

The first series 8 of electrically conducting lines transmits the request from the control circuit 4 to the receiver 5 passing via the monitoring stations 10. The second series 9 of electrically conducting lines transmits the acknowledge signal from the receiver 5 to the control circuit 4 passing via the monitoring stations 10.

In advantageous manner, the control circuit 4 is configured to check whether an acknowledge signal is received by the control circuit 4 after a first predefined time-out.

In advantageous manner, at least one of the monitoring stations 10 is formed by a sequencer 11. This embodiment is advantageous as it is compact and simple to implement. The sequencer 11 has a first input and a first output connected to two electrically conducting lines of the first series 8 of electrically conducting lines. In this way, the first signal 6 can circulate in the first series 8 of electrically conducting lines. The sequencer 11 has a second input and a second output connected to two electrically conducting lines of the second series 9 of electrically conducting lines, in this way, the second signal 7 can circulate in the second series 9 of electrically conducting lines.

Figure 4:
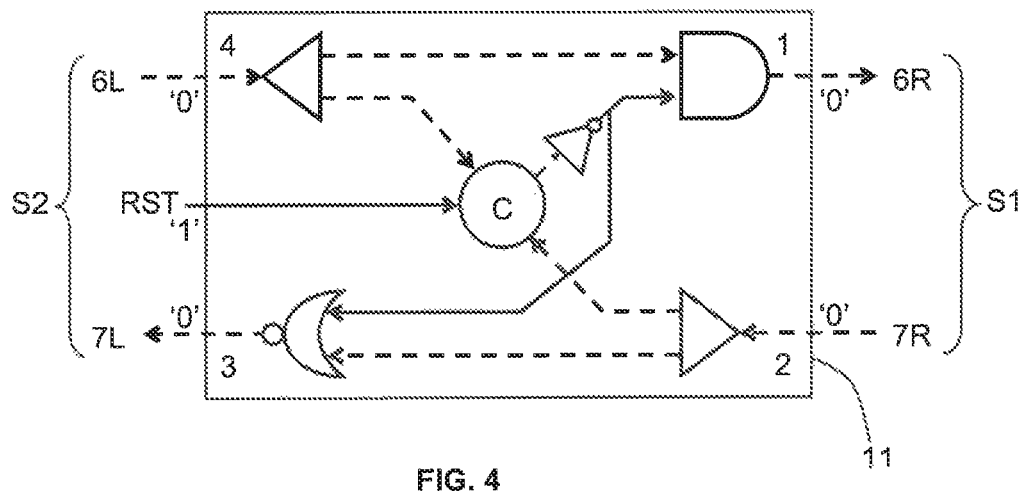
FIGS. 4 to 8 represent steps of operation of an asynchronous monitoring station.

FIG. 4 represents in detail a sequencer 11 with two control channels.

The sequencer 11 comprises four main inputs-outputs, referenced from 1 to 4, on the right, output 1 and input 2 of which are respectively associated with a request signal 6R and an acknowledge signal 7R. These two signals correspond to channel S1 of FIG. 3 which connects two or at least two successive monitoring stations 10 or to the channel which connects the last monitoring station 10 with the receiver 5.

Output 3 and input 4, on the left, are respectively associated with the acknowledge signal 7L and request signal 6L and correspond to channel S2 which connects two or at least two successive monitoring stations 10 or to the channel which connects the control circuit 4 with the first monitoring station 10.

The sequencer 11 further comprises a Müller gate C, also called "rendezvous" gate. The output of a Müller gate copies its inputs when the latter are identical. When the inputs differ, the output remains in its previous logic state.

Gate C receives on input the acknowledge signal 7R from the right channel (input 2) and the request signal 6L from the left channel (input 4). Its output is connected to an input of an "AND" gate on the one hand and to an input of a "NOR" gate on the other hand, by means of an inverter. The Müller gate C further receives a reset signal from the RST input of sequencer 11. This signal is able to force the state on output of gate C.

Furthermore, the signal 6L is duplicated to a second input of the "AND" gate whereas the signal 7R is duplicated to a second input of the "NOR" gate. The signals on output from the "AND" and "NOR" gates respectively form the request signal 6R of the right channel and the acknowledge signal 7L of the left channel, on outputs 1 and 3 of the sequencer 11.

The sequencer 11 then enables operation to be performed with the first state and the second state and the occurrences of the signals 6 and 7 to be compared as described in the foregoing.

FIGS. 4 to 8 illustrate steps of operation of the sequencer 11, taken alone. For ease of understanding, a signal in low state (logic level '0') has been represented by a broken line and a signal in high state (logic level '1') by an unbroken line.

Concerning the sequencer 11, the following convention has been adopted: the signals 6R, 7R, 7L and 6L on the inputs-outputs 1 to 4 are active in high state and the signal RST is active in low state. In other words, the sequencer 11 is in its initialisation phase so long as the signal RST is at '0'.

The RST signal is an initialisation signal which can be used when starting the protection unit and possibly when starting the integrated circuit. After initialisation, all the signals are inactive. The signals 6R, 7R, 7L and 6L are at '0' whereas the RST signal is at '1'. The signal on output from gate C is at '0'. This initial state is represented in FIG. 4. FIG. 4 represents the first state of the monitoring station 10.

Figure 5:
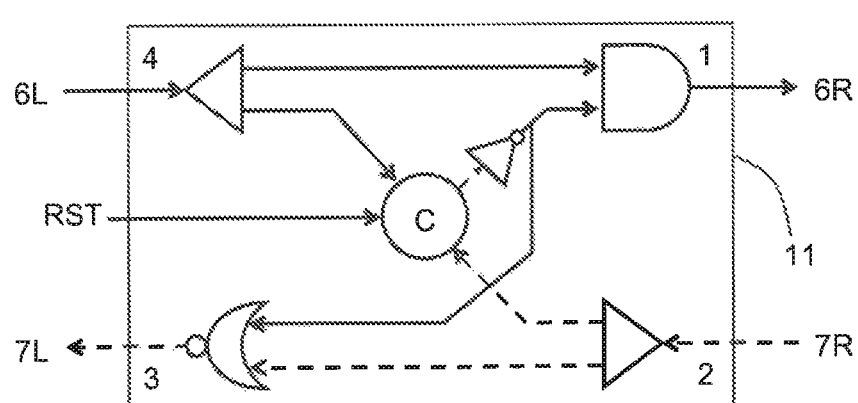
Figure 6:
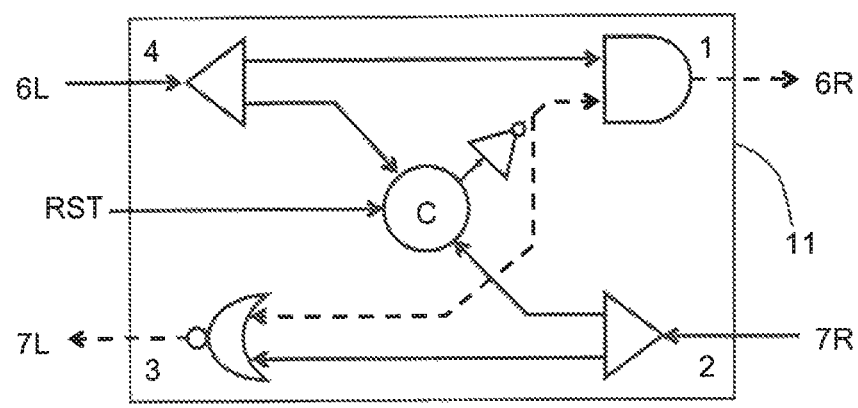

In a first step illustrated in FIG. 5, the request signal 6L of the left channel switches to high state ('1'), which causes switching of the "AND" gate. The request signal 6R of the right channel, on output from the "AND" gate, then switches to '1'. Gate C does not switch as its inputs 6L and 7R differ (LR='1' and 7R='0').

The first signal 6 reaches for example the receiver 5 which transmits an acknowledge signal 7.

In the following step (FIG. 6), the acknowledge signal 7R of the right channel switches to '1' in response to the previous request 6R. This has the consequence of making gate C switch as its inputs 6L and 7R are henceforth all at '1'. The signal on output from gate C switches from '0' to '1', and is then inverted on input of the "AND" gate. The right request 6R then returns to invalid low state ('0').

Figure 7:
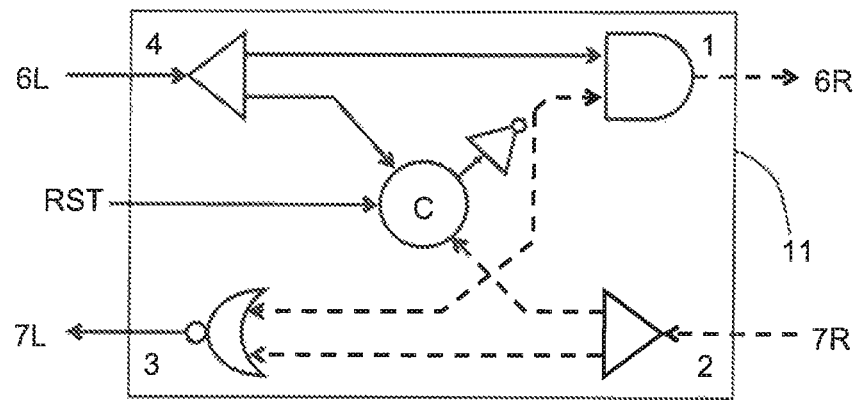
Figure 8:
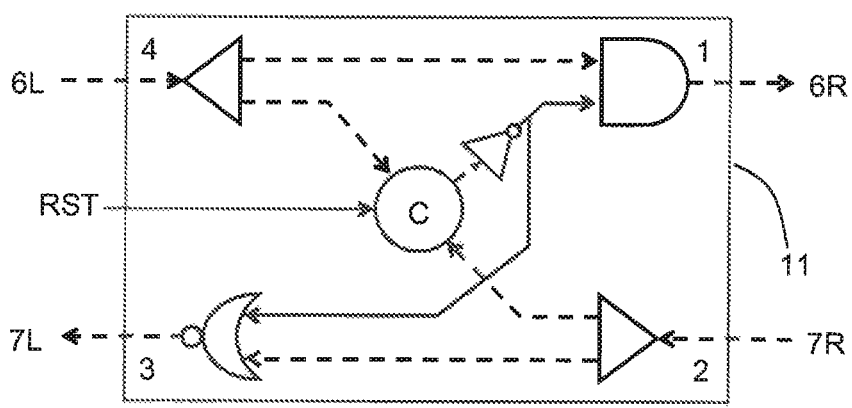

In FIG. 7, the right acknowledge 7R is deactivated and switches to '0'. Gate C does not switch as its inputs differ. This does on the other hand give rise to switching of the "NOR" gate the inputs of which are both at '0'. The acknowledge signal 7L is then active (7L='1'). The second signal 7 is transmitted for the monitoring station to follow in the direction of the control circuit 4. FIG. 7 represents the second state of the monitoring station 10.

Finally, in a last step (FIG. 8), the left request 6L is invalidated (6L='0') following the previous acknowledge 7L which changed the state of the following monitoring station. Gate C switches again. The signal on output of gate C changes state, from '1' to '0', and this change is passed on to the input of the "NOR" gate after inversion. This results in the left acknowledge 7L being deactivated, i.e. set to '0'. The sequencer 11 reverts to its initial state (FIG. 4), the first state of the monitoring station, before starting a new cycle, i.e. again awaiting a new first signal 6.

The sequence can be summed up as follows:
6R='1' ⇒ 6R='1' ⇒ 7R='1' ⇒ 6R='0' ⇒ 7R='0' ⇒ 7L='1' ⇒ 6L='0' ⇒ 7L='0'

The four-phase protocol is first initiated on the left channel S2 of the sequencer 11, by the signal 6L. Then the four phases are chained on the right channel S1, by the signals 6R and 7R which successively switch from '0' to '1' and from '1' to '0'. Finally, the last three phases of the protocol are performed on channel S2.

In a privileged embodiment, the plurality of monitoring stations 10 is formed by a plurality of sequencers 11 having a first input and a first output connected to two electrically conducting lines of the first series 8 of electrically conducting lines and a second input and a second output connected to two electrically conducting lines of the second series 9 of electrically conducting lines.

In such a configuration, the second signal 7 transmitted by the receiver 5 reaches the last monitoring station. The four-phase protocol is applied and the last monitoring station switches from second state to first state.

The second signal is then transmitted from the last monitoring station to the penultimate monitoring station 10. The four-phase protocol is applied and the last monitoring station switches from second state to first state.

Switching of the monitoring stations 10 takes place from one station to the next. This solution appears to be particularly robust, as in case of short-circuiting of several electrically conducting lines of the first series, monitoring stations will switch off and prevent transmission of the second signal. In the event of a short-circuit, monitoring stations 10 placed at different locations in the electric pattern will in fact receive the same first signals. It will then be impossible to perform the successive switchings of the sequencers as the four-phase protocol cannot be carried out.

In a particular embodiment, all the monitoring stations 10 are connected in series as represented in FIG. 3.

Figure 9:
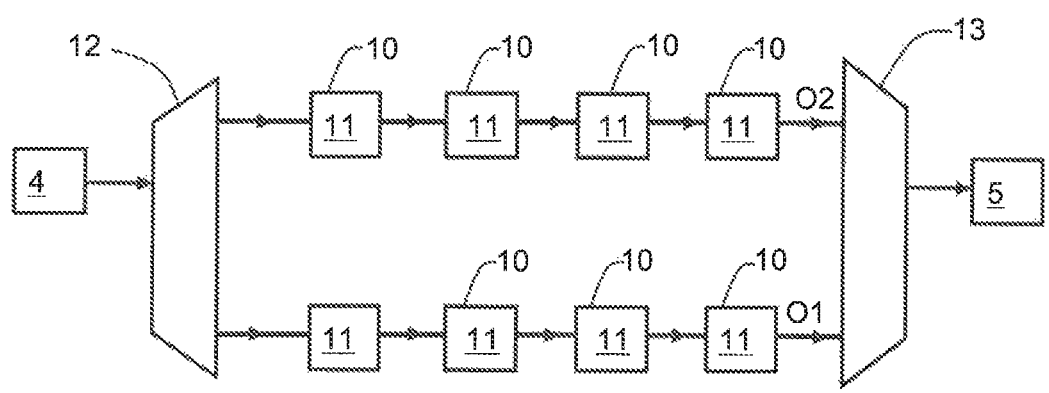
FIGS. 9, 10, 11 and 12 represent other embodiments of the protection circuit in schematic manner.
Figure 10:
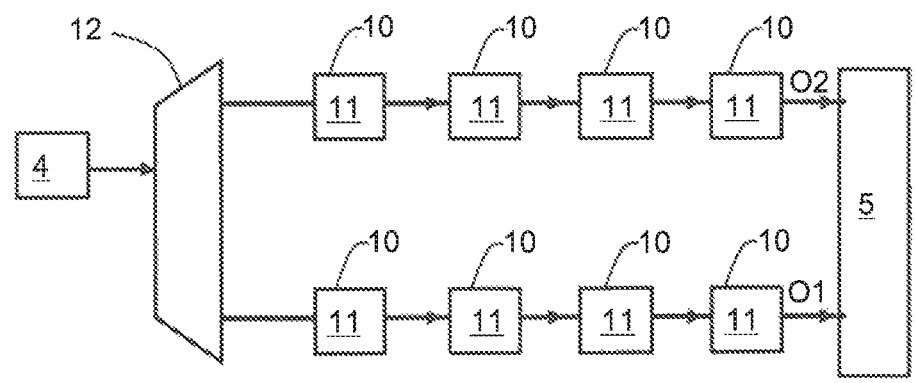

As an alternative, it is possible to provide for all the monitoring stations 10 to be connected in parallel as represented in schematic manner in FIGS. 9 and 10.

In another alternative embodiment, the electric pattern is of any type with communication channels connected in series and/or communication channels connected in parallel or branch-connected.

In an advantageous embodiment, the first series 8 of electrically conducting lines comprises a divergence operator 12 configured to duplicate the first signal 6 received and supplied at least first and second branch-connected conducting lines. The divergence operator 12 distributes the input channel A into several intermediate channels. In the example in FIG. 9, two intermediate channels O1 and O2 are represented.

The divergence operator 12 can be a component which duplicates the input channel A into at least two intermediate channels O1 and O2 of identical size. For example, if input channel A is composed of n+1 wires or rails (n wires for request and 1 wire for acknowledge), channels O1 and O2 are also composed of n+1 wires.

Alternatively, the divergence operator 12 can be configured to divide the n-wire request signal of input channel A into n single-wire intermediate signals (n≥2). Each of the intermediate signals thus obtained forms the request of an intermediate channel O1, O2.

In a particular embodiment illustrated in FIG. 9, the intermediate channels can join one another before reaching receiver 5. It is then advantageous to use a convergence operator 13 which connects the intermediate channels O1 and O2 to the output channel connecting the receiver.

As an alternative, the intermediate channels O1, O2 can reach inputs separated from the receiver 5 as illustrated in FIG. 10.

Each intermediate channel advantageously has at least one monitoring station 10 and each intermediate channel is further provided with an acknowledge wire.

A divergence operator 12 linked to the first series 8 of electrically conducting lines is associated with a convergence operator linked to the second series 9 of electrically conducting lines. In the same way, a convergence operator 13 linked to the first series 8 of electrically conducting lines is associated with a divergence operator linked to the second series 9 of electrically conducting lines. In this way, the first and second signals follow equivalent paths in opposite directions. As an alternative, a convergence operator for a first signal forms a divergence operator for a second signal and a divergence operator for a first signal forms a convergence operator for a second signal.

When the electric pattern has two branch-connected intermediate channels, the two intermediate channels can be connected to a single receiver 5 which can analyse the signals. Example, the receiver 5 can be configured to transmit a second signal 7 when the first signals 6 from the two intermediate channels have reached the receiver. It is also possible to condition transmission of the second signal to the precise order of arrival of the signals and/or to a minimum or maximum time stagger between the two signals coming from the branch channels. Such an embodiment is illustrated in FIG. 10.

Figure 11:
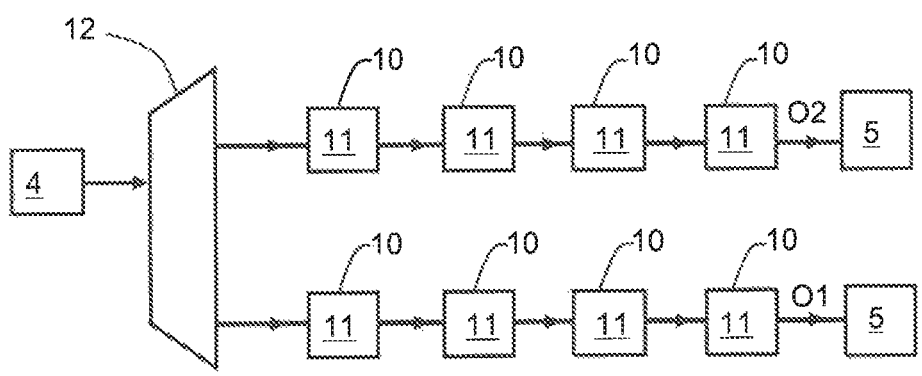

As an alternative, each intermediate channel can be connected to a specific receiver 5. Each intermediate channel makes its first and second signals transit independently from the other intermediate channel. In case of an incident on one of the intermediate channels, one of the second signals will not reach the convergence operator linked to the second signals 7. In one case, the convergence operator 13 comprises a rendez-vous operator which will prevent transmission of the second signal so long as the two signals have not arrived from the two intermediate channels. As an alternative, the convergence operator comprises an adder which sums the two second signals. A signal will reach the control circuit but the latter will detect that the second signal is incomplete or erroneous. Such an embodiment is illustrated in FIG. 11. What is explained for the first signal 6 can also be applied for the second signal 7 and vice versa.

Figure 12:
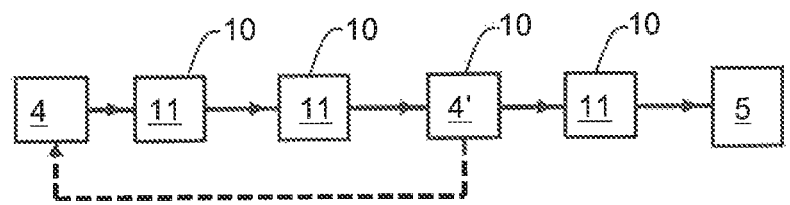

In yet another embodiment illustrated in FIG. 12, the control circuit 4 transmits a first signal which will transit via several monitoring stations 10 of the first series 8 to a transceiver 4'. When the transceiver 4' receives the first signal from the control circuit 4, the latter transmits a new first signal in the first series 8 in the direction of the receiver 5.

When the first signal 6 reaches the receiver 5, the latter transmits a second signal 7 which travels in the opposite direction through the second series 9. The second signal reaches the transmitter/receiver 4' which will also transmit a second signal in the direction of the control circuit 4.

The transceiver 4' is connected to the control circuit 4 and informs the control circuit 4 when it receives the first signal and/or the second signal or when it does not receive the first signal and/or the second signal after a predefined time-out.

This embodiment is advantageous as it enables time monitoring points to be placed inside the shield. These time monitoring points enable an intrusion to be detected quicker as it is no longer necessary to wait until a period representative of the complete transit along the first electric pattern has elapsed.

In an alternative embodiment, when the transceiver 4' receives the first signal from the control circuit 4, the latter transmits a new first signal in the first series 8 in the direction of the receiver 5 and transmits a second signal in the direction of the control circuit. In this configuration, the second signal circulates between the control circuit 4 and the transceiver 4' in simultaneous manner to the first signal which circulates between the transceiver 4' and the receiver 5. This configuration enables the shield to be broken down into separate blocks which are used sequentially on a part of the shield and then simultaneously on another part of the shield. It is then possible to detect an attack more quickly and to locate it more precisely.

In a particular embodiment, the transceiver 4' is for example a monitoring station 10 which is connected to the control circuit 4. The monitoring station 10 sends data relative to its switching to second state and/or to first state. The control circuit 4 is then able to monitor propagation of the signals in the first electric pattern.

In advantageous manner, the control circuit 4 is configured to detect a modification of the electric pattern by absence of receipt of the second signal 7 or the acknowledge signal after a first predefined time-out. As soon as the control circuit 4 detects that the first timeout has been reached, the control circuit 4 can request or impose a change of operation of the functional block 1 in response to this detection. In a preferential embodiment, the first timeout is counted down from transmission of the first signal 6 by the control circuit 4.

In a particular embodiment, the request signal can be associated with the data which transits between the two monitoring stations 10. In this case, the request and the data form a single first signal 6, on several bits, each bit being encoded at least on two wires ("double rail" encoding for example). In other words, the first request signal 6 is not necessarily conveyed by a single wire.

If two shields are supplied by a single control circuit, it is advantageous to connect a sequence comparator to one element of each of the intermediate channels. The sequence comparator is configured to compare the state of the two elements. The comparator delivers a signal representative of this comparison. The result of this comparison can be sent to the control circuit 4. The protection device 2 can modify the operation of the functional block 1 according to the result of the comparison. This configuration is particularly advantageous in order to detect which intermediate channel is at fault.

The invention claimed is:

1. Integrated circuit comprising:
   a functional block configured to perform a plurality of logic and/or analog functions,
   a protection device comprising:
      a control circuit configured to transmit at least a first signal and to receive a second signal,
      a receiver configured to receive the at least first signal and to transmit the second signal on receipt of the at least first signal,
      a first series of electrically conducting lines connecting the control circuit to the receiver to perform transit of the at least first signal,
      a second series of electrically conducting lines connecting the receiver to the control circuit to perform transit of the second signal,
      a plurality of monitoring stations simultaneously connected to the first and second series of electrically conducting lines to define a first elementary electric pattern in the first series of electrically conducting lines and a distinct second elementary electric pattern equivalent to the first elementary electric pattern in the second series of electrically conducting lines,
      a shield arranged to at least partially cover the functional block, the shield comprising a part of the assembly formed by the first and second series of electrically conducting lines,
   integrated circuit wherein the control circuit is configured to detect a modification of the first elementary electric pattern with respect to the second elementary electric pattern by means of the absence of receipt of the second signal after a predefined time-out.

2. Integrated circuit according to claim 1, wherein each monitoring station is configured to measure a difference of occurrence between the at least first signal and the second signal and to disable propagation of at least one of the first and second signals according to said measurement.

3. Integrated circuit according to claim 1, wherein each monitoring station is configured to present a first state enabling passage of the at least first signal and a second state disabling passage of the first signal, each monitoring station being configured to switch from first state to second state on receipt of the at least first signal and to switch from second state to first state on receipt of the second signal.

4. Integrated circuit according to claim 3, wherein each monitoring station is configured to present a second state enabling passage of the second signal and a first state disabling passage of the second signal.

5. Integrated circuit according to claim 1, wherein each monitoring station is formed by a sequencer having a first input and a first output connected to two electrically conducting lines of the first series of electrically conducting lines and a second input and a second output connected to two electrically conducting lines of the second series of electrically conducting lines.

6. Integrated circuit according to claim 5, wherein the sequencer is an asynchronous sequencer.

7. Integrated circuit according to claim 1, wherein the first and second series of electrically conducting lines are arranged above the functional block and wherein the second series of electrically conducting lines is arranged between the first series of electrically conducting lines forming the shield and the functional block.

8. Integrated circuit according to claim 1, wherein the first and second series of electrically conducting lines are arranged above the functional block and wherein the first series of electrically conducting lines is located between the second series of electrically conducting lines forming the shield and the functional block.

9. Integrated circuit according to claim 1, wherein the first and second series of electrically conducting lines are arranged above the functional block, wherein a first part of the first series and a first part of the second series of electrically conducting lines form the shield, and in that a second part of the first series and a second part of the second series of electrically conducting lines are arranged between the shield and the functional block.

10. Integrated circuit according to claim 5, wherein the first series of electrically conducting lines comprises a divergence circuit configured to duplicate the first signal received and to supply at least first and second branch-connected lines, the first and second branch-connected lines respectively comprising a first and second sequencer.

11. Integrated circuit according to claim 1, wherein the control circuit is configured to request a change of operation of the functional block in response to detection of modification of the first elementary electric pattern with respect to the second elementary electric pattern.

12. Protection method of an integrated circuit comprising the following successive steps:
   providing an integrated circuit comprising:
      a functional block configured to perform a plurality of logic and/or analog functions,
      a first elementary electric pattern defined by a first series of electrically conducting lines,
      a distinct second elementary electric pattern equivalent to the first elementary electric pattern, the second elementary electric pattern being defined by a second series of electrically conducting lines, a plurality of monitoring stations simultaneously connected to the first and second series of electrically conducting lines,
a shield arranged to at least partially cover the functional block, the shield comprising a part of the assembly formed by the first and second series of electrically conducting lines,
transmitting at least a first signal on the first series of electrically conducting lines from the control circuit in the direction of a receiver,
checking whether a second signal is received by the control circuit from the second series of electrically conducting lines after a first predefined time-out.

13. Method according to claim 12, wherein the control circuit triggers a response strategy modifying the operation of the functional block if the control circuit has not received the second signal after the first predefined time-out.

* * * * *